US008634831B2

(12) United States Patent
Jung et al.

(10) Patent No.: US 8,634,831 B2
(45) Date of Patent: Jan. 21, 2014

(54) METHOD OF SCANNING NEIGHBOR BASE STATION IN A BROADBAND WIRELESS ACCESS SYSTEM (75) Inventors: In Uk Jung, Anyang-si (KR); Jin Sam Kwak, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/378,992

(22) PCT Filed: Jun. 17, 2010

(86) PCT No.: PCT/KR2010/003918
§ 371 (c)(1),
(2), (4) Date: Dec. 16, 2011

(87) PCT Pub. No.: WO2010/147409
PCT Pub. Date: Dec. 23, 2010

(65) Prior Publication Data
US 2012/0094664 A1    Apr. 19, 2012

Related U.S. Application Data (60) Provisional application No. 61/218,050, filed on Jun. 17, 2009.

(30) Foreign Application Priority Data

Mar. 19, 2010    (KR) .................. 10-2010-0024653

(51) Int. Cl.
*H04W 4/00*    (2009.01)
*H04W 36/00*    (2009.01)
*H04W 72/00*    (2009.01)
*H04L 12/28*    (2006.01)

(52) U.S. Cl.
USPC ........... 455/434; 455/436; 455/450; 370/329; 370/331; 370/338; 370/395.4; 370/431

(58) Field of Classification Search
USPC ................... 455/434, 435.1–444, 448–452.2; 370/331, 395.4, 431, 338
See application file for complete search history.

(56) References Cited

U.S. PATENT DOCUMENTS

2006/0084453 A1    4/2006  Kim et al.
2007/0060048 A1    3/2007  Kang et al.

(Continued)

FOREIGN PATENT DOCUMENTS

KR    1020050119054    12/2005
KR    1020070030683    3/2007

*Primary Examiner* — Vladimir Magloire
*Assistant Examiner* — Michael Mapa
(74) *Attorney, Agent, or Firm* — Lee, Hong, Degerman, Kang & Waimey (57) ABSTRACT The present invention relates to a broadband wireless access system, and more particularly, to a method for a mobile station to efficiently scan a neighbor base station and apparatus therefor. According to one embodiment of the present invention, in a broadband wireless access system, a method of performing a scan, which is performed by a mobile station to scan a neighbor base station, includes the steps of receiving a scan response (AAI_SCN-RSP) message including a first interval information indicating an interval for the mobile station to receive a preamble of the neighbor base station from a serving base station and receiving the preamble from the neighbor base station in the first interval. Preferably, the first interval is set by a subframe unit.

16 Claims, 6 Drawing Sheets

(56) References Cited

U.S. PATENT DOCUMENTS

| | | |
|---|---|---|
| 2008/0056195 A1 | 3/2008 | Lee et al. |
| 2008/0214182 A1* | 9/2008 | Wang et al. .................. 455/423 |
| 2009/0117891 A1* | 5/2009 | Chou ............................ 455/423 |
| 2010/0041341 A1* | 2/2010 | Stratford .................... 455/67.14 |

\* cited by examiner

METHOD OF SCANNING NEIGHBOR BASE STATION IN A BROADBAND WIRELESS ACCESS SYSTEM

This application is the National Stage filing under 35 U.S.C. 371 of International Application No. PCT/KR2010/003918, filed on Jun. 17, 2010, which claims the benefit of earlier filing date and right of priority to Korean Application Serial No. 10-2010-0024653, filed on Mar. 19, 2010, and also claims the benefit of U.S. Provisional Application Ser. No. 61/218,050, filed on Jun. 17, 2009, the contents of which are all incorporated by reference herein in their entirety.

TECHNICAL FIELD

The present invention relates to a broadband wireless access system, and more particularly, to a method for a mobile station to efficiently scan a neighbor base station and apparatus therefor.

BACKGROUND ART

First of all, in the following description, a method for a mobile station to perform scanning on a neighbor base station is explained.

Figure 1:
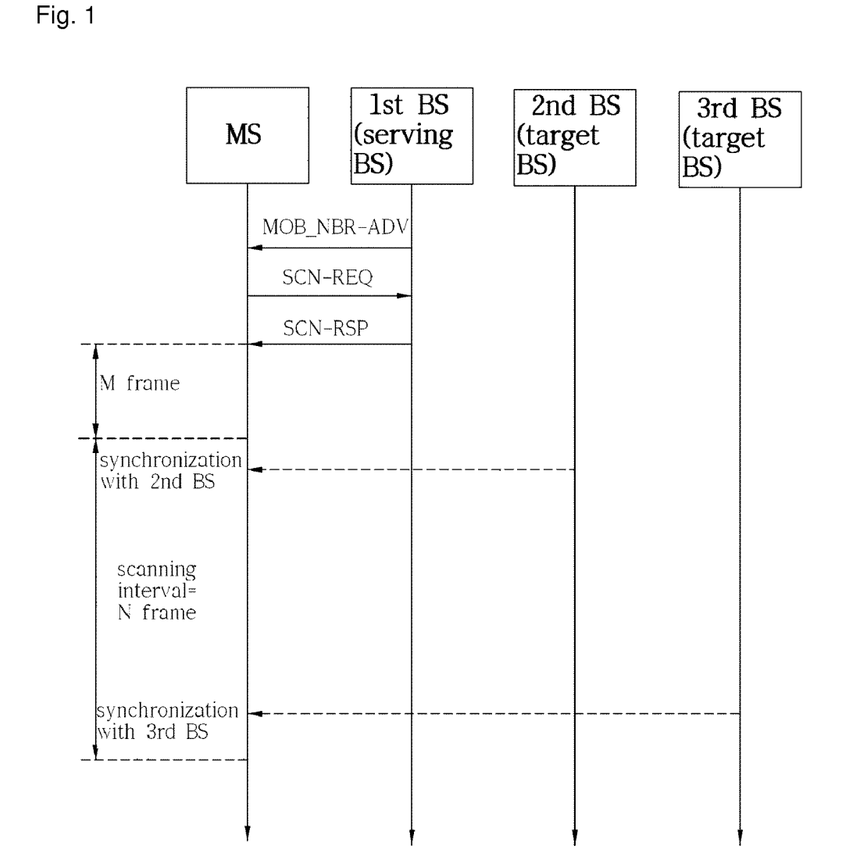
FIG. 1 is a flowchart for a method of scanning a neighbor base station according to a related art.

FIG. 1 is a flowchart for a method of scanning a neighbor base station according to a related art.

Referring to FIG. 1, a serving base station connected to a mobile station broadcasts information on a neighbor base station to all mobile stations within its cell.

The information on the neighbor base station is carried on a neighbor advertisement (MOB_NBR-ADV) message. Table 1 shows one example for a configuration of MOB_NBR-ADV message.

TABLE 1

| Syntax | Size | Notes |
|---|---|---|
| MOB_NBR-ADV_Message_Format( ){ | | |
| Management Message Type=49 | 8 bits | |
| Operator ID | 24 bits | Unique ID assigned to the operator |
| N_NEIGHBORS | 8 bits | |
| For(j=0; j<N_NEIGHBORS; j++){ | | |
| Neighbor BS-ID | 48 bits | |
| Physical Frequency | 32 bits | |
| Configuration Change Count | 8 bits | |
| Hysteresis threshold | 8 bits | |
| MAHO report period | 8 bits | |
| TVL Encoded Neighbor information | Variable | TLV specific |
| } | | |
| } | | |

Referring to Table 1, the number of neighbor base stations, a neighbor base station identifier (BSID), frequency used by a neighbor base station, channel information of a neighbor base station and the like are included in the MOB_NBR-ADV message.

Having received this message, the mobile station temporarily stops receiving the data transmitted by the serving base station and then sends a scan request (MOB_SCN-REQ) message for obtaining a duration for channel quality measurement from the neighbor base station to the serving base station. Table 2 shows one example for a configuration of MOB_SCN-REQ message.

TABLE 2

| Syntax | Size | Notes |
|---|---|---|
| MOB_SCN_REQ_Message_Format( ){ | | |
| Management Message Type = 50 | 8 bits | |
| Scan Duration | 12 bits | Units are frames |
| Reserved | 4 bits | |
| } | | |

While the mobile station is measuring a channel quality of the neighbor base station, the serving base station stops transmitting data to the mobile station. Afterwards, the serving base station is then able to transmit data after the scan duration requested by the mobile station. The serving base station sends a scan response (MOB_SCN-RSP) message to the mobile station in response to the MOB_SCN-REQ. Table 3 shows one example for a configuration of MBO_SCN-RSP message.

TABLE 3

| Syntax | Size | Notes |
|---|---|---|
| MOB_SCN-RSP_Message_Format( ){ | | |
| Management Message Type = 50 | 8 bits | |
| Scan Duration | 12 bits | Units are frames |
| Start Frame | 4 bits | |
| } | | |

Referring to Table 3, the base station secures the scan duration requested by the mobile station. Subsequently, the mobile station waits for a time of a start frame and then starts a base station scan.

For the scan duration, the mobile station receives a preamble of the neighbor base station. Before describing the preamble, a frame structure of IEEE 802.16m system is explained as follows.

First of all, a frame structure of a system, which meets the IEEE 802.16m specification, is configured by a unit of super frame (SFH). Each SFH is transmitted by 20 ms periodicity. One SFH consists of 6, 7 or 8 subframes. Various subframe types and sizes are defined for the SFH according to at least one of a system bandwidth, a cyclic prefix (CP) length and the like. In case of type-1, a subframe length is 0.617 ms. A pattern, at which an uplink/downlink (UL/DL) map for data transmission and reception is located, is indicated by the SFH. In this case, the uplink/downlink (UL/DL) map can be received in each subframe time or each second subframe (i.e., one MP for 2 subframes).

In general, a preamble is transmitted by a frame unit from a base station. And, preambles can be classified into a PA preamble and an SA preamble. In this case, the PA preamble is a primary advanced preamble. And, information on a system bandwidth and carrier setting can be included in the PA preamble. Meanwhile, the SA preamble is a secondary advanced preamble. Information on a cell ID, a base station type and the like can be included in the SA preamble. And, the SA preamble is required for obtaining basic synchronization. In this case, the base station type can include such information as a macro base station, a femto base station and the like.

One super frame generally carries one PA preamble and three SA preambles. A most efficient preamble transmission sequence for a scan includes [SA Preamble], [PA Preamble], [SA Preamble] and [SA Preamble] in order.

When a mobile station scans a neighbor base station operating on an inter-frequency different from that of a serving base station, an interruption time occurs in the course of a communication with the serving base station. This is attributed to the fact that the mobile station receives a preamble of the neighbor base station and then temporarily interrupts the communication with the serving base station to match synchronization in downlink (DL). This is explained with reference to FIG. 2 as follows.

Figure 2:
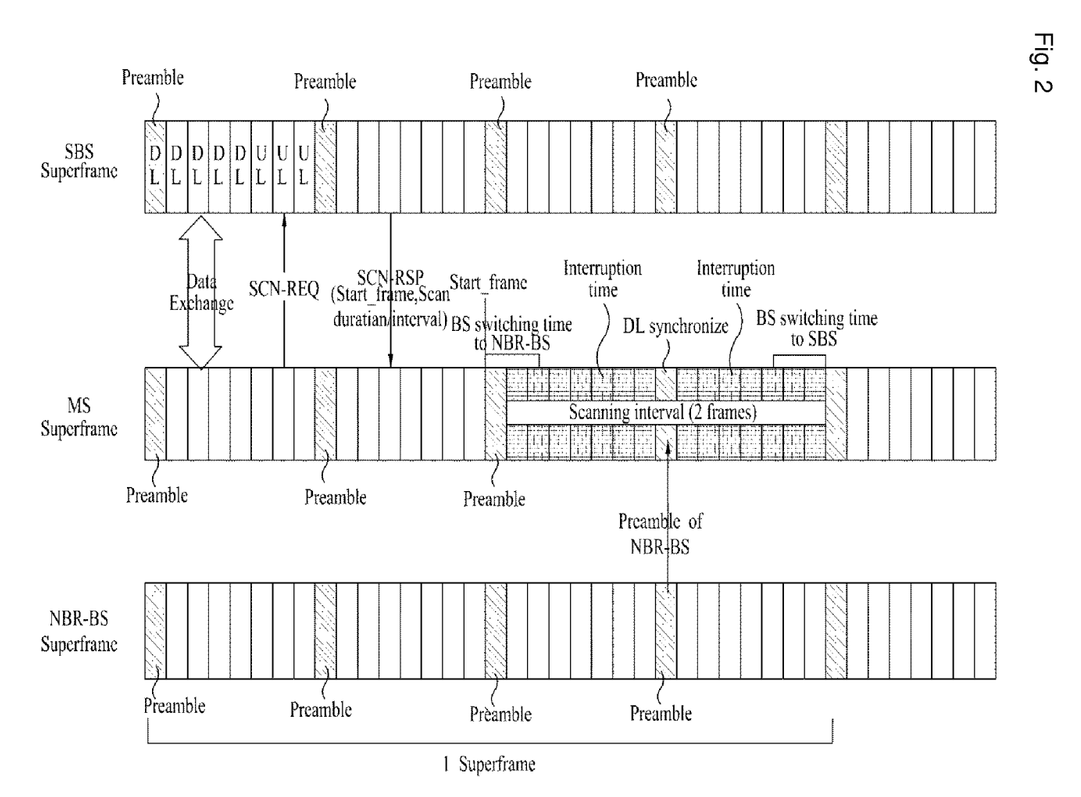
FIG. 2 is a diagram for an interruption time that may occur in the course of performing a scan in a general IEEE 802.16e network.

FIG. 2 is a diagram for an interruption time that may occur in the course of performing a scan in a general IEEE 802.16e network.

Referring to FIG. 2, a mobile station sends a scan request message to a serving base station to attempt a scan of a neighbor base station in the course of performing data exchange with the serving base station. In response to the scan request message, having received the scan request message, the mobile station performs a scan of the neighbor base station during a scan length/interval (scan duration/interval) by a frame unit from a timing point indicated by start frame (start_frame) information included in the received message.

Total interruption time occurring due to the scan is 10 ms. That is, the interruption time starts when a base station (BS) switching starts with a third frame. And, the interruption time ends before a start of a next frame after the reception of the preamble of the neighbor base station. Hence, total 10 ms interruption time occurs. In this case, the base station (BS) switching time is variable but is assumed as 1 subframe.

In doing so, although the information necessary for the mobile station is one preamble only, 10 ms is consumed to receive it normally. Therefore, a scan procedure for reducing the unnecessarily occurring interruption time is requested. In addition, in case of the general IEEE 802.16e (WiMAX Rel 1.0 or Rel. 1.5), as scan information can be obtained from one preamble transmitted each frame of 5 ms length, even if a scan interval is set for a random frame, it is able to obtain preamble information of the neighbor base station. However, in case of the IEEE 802.16m system, when additional time synchronization is necessary for inter-frequency due to a sync channel divided into a primary sync channel and a secondary sync channel, acquisition of the primary sync channel is requested or acquisition of the secondary sync channel is necessary for a cell ID based scan. Thus, when the hierarchical sync channel structure is taken into consideration, an efficient scheme for a scan interval setting and indication of the scan interval setting is requested.

DISCLOSURE OF INVENTION

Technical Problem

Accordingly, the present invention is directed to a method for a mobile station to efficiently scan a neighbor base station and apparatus therefore that substantially obviate one or more of the problems due to limitations and disadvantages of the related art.

An object of the present invention is to provide a scanning method and apparatus, by which a scan can be efficiently performed in a manner of reducing an interruption time attributed to the scan.

Another object of the present invention is to provide a scanning method and apparatus, by which a scan can be efficiently performed in consideration of a base station switching capability of a mobile station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Solution to Problem

The present invention discloses an efficient neighbor base station scanning method to solve the above technical tasks.

To achieve these and other advantages and in accordance with the purpose of the present invention, as embodied and broadly described, in a broadband wireless access system, a method of performing a scan, which is performed by a mobile station to scan a neighbor base station, includes the steps of receiving a scan response (AAI_SCN-RSP) message including a first interval information indicating an interval for the mobile station to receive a preamble of the neighbor base station from a serving base station and receiving the preamble from the neighbor base station in the first interval, wherein the first interval is set by a subframe unit.

Preferably, the scan response message further includes start frame information and the preamble receiving step is performed in a frame indicated by the start frame information.

Preferably, the scan response message includes a first duration information and a second interval information indicating an interval for the mobile station to perform a data exchange with the serving base station, the first duration includes at least one second duration, and the at least one second duration includes the first interval and base station (BS) switching times respectively located before and after the first interval.

More preferably, the method further includes the step of performing the data exchange with the serving base station during a third interval resulting from excluding the at least one second duration from the first duration.

More preferably, the scan response message further includes information indicating a count of iterating the first duration and the second interval.

More preferably, the method further includes the step of sending a scan request message including BS switching capability information of the mobile station for determining the base station switching time to the serving base station.

More preferably, the first interval is a scanning interval, the second interval is an interleaving interval, the third interval is a sub-interleaving interval, the first duration is a scan duration, and the second duration is a sub-scan duration.

To further achieve these and other advantages and in accordance with the purpose of the present invention, in a broadband wireless access system, a method of supporting a scan, which is supported by a serving base station to enable a mobile station to scan a neighbor base station, includes the step of sending a scan response (AAI_SCN-RSP) message including a first interval information indicating an interval for the mobile station to receive a preamble of the neighbor base station to the mobile station, wherein the serving base station does not perform a scheduling of the mobile station during the first interval and base station (BS) switching times respectively located before and after the first interval.

Preferably, the scan response message includes a first duration information and a second interval information indicating an interval for the mobile station to perform a data exchange with the serving base station, the first duration includes at least one second duration, and the at least one second duration includes the first interval and the base station (BS) switching times respectively located before and after the first interval.

More preferably, the base station performs the scheduling on the mobile station during a third interval resulting from excluding the at least one second duration from the first duration.

More preferably, the scan response message further includes information indicating a count of iterating the first duration and the second interval.

More preferably, the method further includes the step of receiving a scan request message including BS switching capability information of the mobile station for determining the base station switching time from the mobile station.

More preferably, the first interval is a scanning interval, the second interval is an interleaving interval, the third interval is a sub-interleaving interval, the first duration is a scan duration, and the second duration is a sub-scan duration.

To further achieve these and other advantages and in accordance with the purpose of the present invention, a mobile station includes a processor and a radio communication (RF) module configured to transceive a radio signal externally under the control of the processor, wherein the processor controls a scan to be performed by obtaining a first interval information indicating an interval for the mobile station to receive a preamble of the neighbor base station from a scan response (AAI_SCN-RSP) message received from a serving base station and then receiving the preamble from the neighbor base station in the first interval.

Preferably, the scan response message further includes a start frame information and the processor controls the preamble to be received in a frame indicated by the start frame information.

More preferably, the scan response message includes a first duration information and a second interval information indicating an interval for the mobile station to perform a data exchange with the serving base station, the first duration includes at least one second duration, and the at least one second duration includes the first interval and base station (BS) switching times respectively located before and after the first interval.

In this case, the processor controls a data exchange with the serving base station to be performed during a third interval resulting from excluding the at least one second duration from the first duration.

Moreover, the first interval is a scanning interval, the second interval is an interleaving interval, the third interval is a sub-interleaving interval, the first duration is a scan duration, and the second duration is a sub-scan duration.

It is to be understood that both the foregoing general description and the following detailed description are exemplary and explanatory and are intended to provide further explanation of the invention as claimed.

Advantageous Effects of Invention

Accordingly, the present invention provides the following effects or advantages.

First of all, using embodiments of the present invention, as a scanning interval is allocated by a subframe unit, an interruption time due to a scan is reduced. Therefore, a scanning operation of a mobile station can be efficiently performed.

Secondly, using embodiments of the present invention, a base station switching capability of a mobile station is negotiated through a scan request message and a scan response message, whereby a scan can be performed more efficiently.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

MODE FOR THE INVENTION

The present invention relates to a wireless access system. Reference will now be made in detail to methods of efficient neighbor base station scan according to various embodiments of the present invention, examples of which are illustrated in the accompanying drawings.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of the drawings, procedures, steps and/or the like are not described to avoid making the gist of the present invention unclear.

In this disclosure, embodiments of the present invention are described centering on the data transmission/reception relations between a base station and a mobile station. In this case, the base station is meaningful as a terminal node of a network which directly performs communication with the terminal. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an advanced base station (ABS), an access point and the like. And, 'mobile station' can be replaced by such a terminology as a user equipment (UE), a subscriber station (SS), a mobile subscriber station (MSS), a mobile terminal, an advanced mobile station (AMS) and the like.

Moreover, a transmitting side means a node configured to transmit a data or speech service and a receiving side means a node configured to receive the data or speech service. Therefore, in uplink, a mobile station becomes a transmitting side and a base station can become a receiving side. On the contrary, in downlink, a mobile station becomes a receiving side and a base station can become a transmitting side.

Besides, a mobile station of the present invention can include a PDA (personal digital assistant), a cellular phone, a PCS (personal communication service) phone, a GSM (global system for mobile) phone, a WCDMA (wideband CDMA) phone, an MBS (mobile broadband system) phone or the like.

Embodiments of the present invention can be implemented using various means. For instance, embodiments of the present invention can be implemented using hardware, firmware, software and/or any combinations thereof.

In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, all terminologies disclosed in this document can be supported by at least one of P802.16-2004, P802.16e-2005, P802.16Rev2 and P802.16m documents which are the standards of IEEE 802.16 system.

Specific terminologies used in the following description are provided to help the understanding of the present invention. And, the use of the specific terminology can be modified into another form within the scope of the technical idea of the present invention.

First Embodiment

According to one embodiment of the present invention, in order to enable a scan of a neighbor base station by reducing an interruption time, it is proposed to set a scanning interval not by a frame unit but by a subframe unit.

For this, it is able to allocate a scanning interval of a mobile station so that the scanning interval can match a specific one of preambles of neighbor base stations (e.g., an SA preamble).

That is, in case of performing a scan procedure on the assumption that a base station has a frame structure of a general IEEE 802.16m system, a scanning interval enough to receive one preamble from a scanning target base station can be allocated to a mobile station. This is explained with reference to FIG. 3 as follows.

Figure 3:
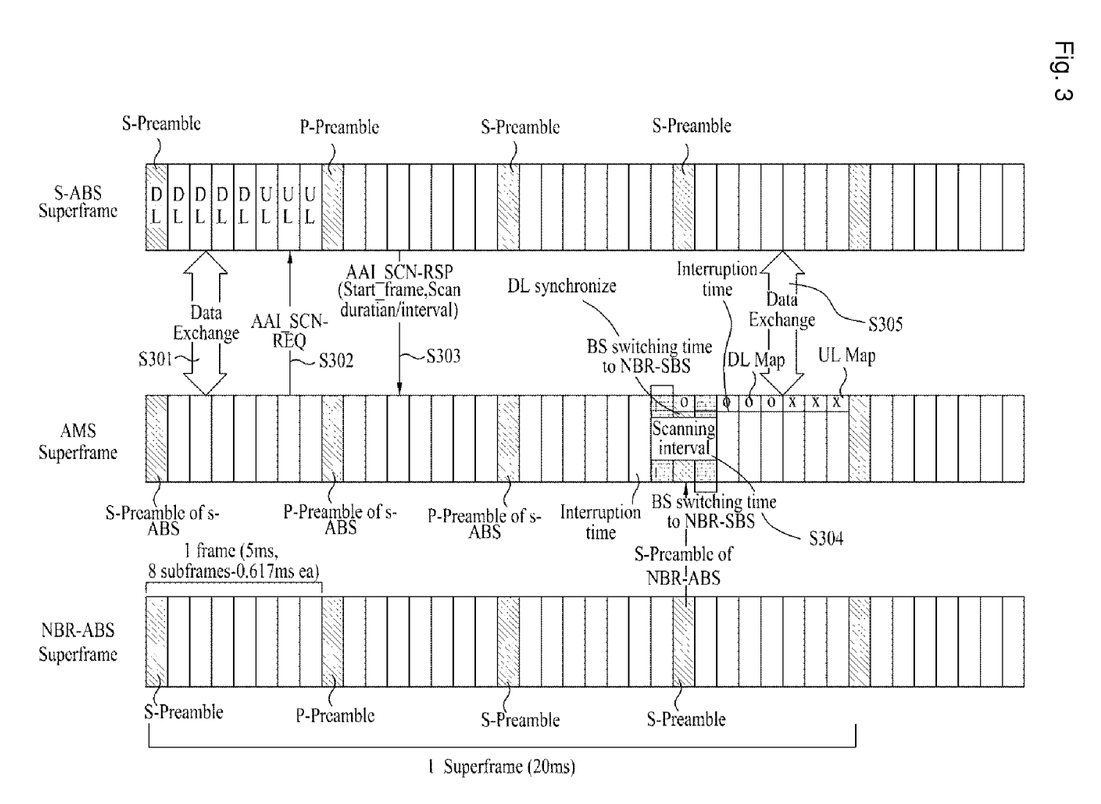
FIG. 3 is a diagram of one example for a scan performing procedure according to one embodiment of the present invention.

FIG. 3 is a diagram of one example for a scan procedure according to one embodiment of the present invention.

In FIG. 3, it is assumed that a base station (BS) switching time of a mobile station is set to 1 subframe.

Referring to FIG. 3, while a mobile station is performing a data exchange with a serving base station [S301], the mobile station sends a scan request (AAI_SCN-REQ) message to the serving station to scan a neighbor base station [S302].

In response to the scan request made by the mobile station, the serving base station sends a scan response (AAI_SCN-RSP) message to the mobile station [S303]. In this case, start frame information, start offset information, scanning interval information of a subframe unit and the like can be included in the scan response message.

If the start frame information included in the scan response message indicates a 4th frame, since a base station switching time is 1 subframe, the mobile station performs a base station switching in an 8th subframe of a 3rd frame, receives an SA preamble of the 4th frame corresponding to a scanning interval, and then performs a switching to the serving station in a next subframe again [S304].

Afterwards, the mobile station receives a DL map of the serving base station and is then able to normally perform a data exchange with the serving base station.

As mentioned in the description of the above method, an interruption time generated from allocating a scanning interval at a subframe level amounts to 3 subframes, i.e., 1.851 ms. Compared to a general scanning method, this indicates that the interruption time can be reduced by 8.149 ms (i.e., 81.5%). In case of a subframe in which an SA preamble is transmitted, since a mobile station is able to perform camping within a corresponding subframe after detection of the SA-preamble of one symbol, a substantial interruption time can be reduced up to 2 subframes. Moreover, as a reception-transmission gap (RTG) for current time division duplex (TDD) or an idle time for frequency division duplex (FDD) is defined at a last part of a UL subframe, if inter-frequency camping is performed using the RTG or the idle time, a scan can be performed within one subframe extremely. That is, a substantial scanning interval can includes minimum 1 subframe up to maximum plural subframes. Therefore, whether a base station allocates a scanning interval of a prescribed value to a mobile station can be determined according to: 1) BS switching capability of a mobile station; or 2) frequency assignment (FA) of a switching target base station (e.g., a scan target base station).

1) BS Switching Time According to Capability of a Mobile Station

On the assumption that each mobile station can have a different base station (BS) switching time, a mobile station informs a base station of its BS switching time via capability negotiation in an initial network access (i.e., capability negotiation via AAI_SBC-REQ and AAI_SBC-RSP messages) or a scan request message sent to the base station during a scanning procedure. If the base station enables a scan to be performed via a scan response message while unaware of the BS switching time capability of the mobile station, the base station is able to allocate a scanning interval via a scan response message in consideration of a BS switching time that can be set to a greatest value.

2) BS Switching Time According to Frequency Assignment (FA) of a Switching Target Base Station As IEEE 802.16m system considers a multi-carrier configuration, each base station is able to exchange information via a plurality of frequency assignments (FA). Therefore, inter-frequency scanning or inter-frequency handover (HO) can occur frequently. Thus, if a frequency assignment (FA), on which a scan target base station operates, currently has a big difference from a frequency assignment of a serving base station, a BS switching time may increase. On the contrary, if a frequency assignment of a scan target base station is contiguous with that of a serving base station, a BS switching time of a mobile station will decrease to the extent of the contiguousness. Therefore, the serving base station is able to allocate a scanning interval to the mobile station in consideration of the frequency assignment of the scan target base station.

Meanwhile, when a base station allocates a scanning interval of a subframe unit to a mobile station via AAI_SCN-RSP message, interleaving interval information can be delivered to the mobile station as well. In this case, the interleaving interval means an interval configured to enable a mobile station to perform a data exchange with a serving base station because a scan is not scheduled between scanning intervals.

In the following description, one example for a scan response (AAI_SCN-RSP) message containing the above mentioned informations is explained with reference to Table 4.

TABLE 4

| Syntax | Size (bit) | Notes |
|---|---|---|
| AAI_SCN-RSP_Message_format( ) { | | |
| Management Message Type = x5 | 8 | |
| Report mode | 2 | 0b00: No report 0b01: Periodic report 0b10: Event-triggered report 0b11: One-time scan report |
| Reserved | 3 | |
| Rsp_Seq_Num | 1 | One-bit sequence number for this message that is toggled for each new message. |
| Use_Nbr_Bitmap_Index | 1 | Indicates if the bitmap of BS indexes for AAI_NBR-ADV is used. 0: Bitmap of BS indexes for AAI_NBR-ADV is not used. 1: Bitmap of BS indexes for AAI_NBR-ADV is not used. |
| Use_Req_Bitmap_Index | 1 | Indicates if the bitmap of BS indexes for AAI_SCN-REQ is used. 0: Bitmap of BS indexes for AAI_SCN-REQ is not used. 1: Bitmap of BS indexes for AAI_SCN-REQ is not used. |
| Report period | 8 | If Report mode is set to 0b01 or 0b11, this is the Report Period, in frames; otherwise this field is set to 0. For MS request denied (Scan Duration == 0), Report period is the number of frames that BS suggests to MS before transmitting next AAI_SCN-REQ. |
| Report metric | 8 | Bitmap indicating metrics on which the cor-responding triggers are based: Bit 0: BS CINR mean Bit 1: BS RSSI mean Bit 2: RTD mean Bit 3: Number of missed frames Bits 4-7: Reserved; shall be set to zero. |
| if (Scan Duration != 0) { | | |
| Start frame | 8 | |
| Interleaving interval | 8 | Duration in frames. |
| Scan iteration | 8 | |
| If( Use_Nbr_Bitmap_Index == 1){ | | |
| Configuration change count for AAI_NBR-ADV | 8 | |
| Reserved | 2 | Shall be set to zero |
| Nbr_Bitmap_Size | 6 | Size of Nbr_Bitmap_Index in nibbles ((Nbr_Bitmap_Size + 1)*4), which may be less than or equal to the number of BSs in AAI_NBR-ADV. |
| Nbr_Bitmap_Index | (Nbr_Bitmap_Size + 1)*4 | Each bit position in this bitmap cor-responds to a BS Index of the corresponding AAI_NBRADV message, where the least significant bit corresponds to the first BS Index, each next significant bit corresponds to the next BS Index, the most significant bit corresponds to the BS Index of the last recommended BS, and BSs with BS Index greater than the last recommended BS are not recommended and do not have a corresponding bit position in the bitmap. Bitmap position bit value: 0: the corresponding BS is not recommended. 1: the corresponding BS is recommended. When Use_Req_Bitmap_Index equals 1, Nbr_Bitmap_Index only includes BSs that were included in the AAI_NBR-ADV message but that were not included in the corresponding AAI_SCN-REQ message. |

TABLE 4-continued

| Syntax | Size (bit) | Notes |
|---|---|---|
| For( each '1' in Nbr_Bitmap_Index ){ | | |
| Nbr_Frame_offset | 3 | The relative frame offset value of the Nbr_BS in subframe units (max 8 subframes). In case the Nbr_BS has different frame configuration to the S-ABS, the Start frame shall take account this frame offset value for correct frame (preamble) alignment during scanning. If this value is 0, it implies that the Nbr_BS is well aligned with the S-ABS. |
| If (Nbr_Frame_offset !=0) Frame_configuration_information | 8 | If the frame offset of the NBR_BSis different from the S-ABS, the BS type is different and so will be the frame configuration (mixed mode, 16m only mode, YBS etc). This information includes the related frame configuration information (details of what to include is TBD). This may also be included as a TLV. |
| Scanning_interval | 3 | Number of subframes to scan at the Nbr_BS |
| Nbr_Scanning_start_frame | 1 | The specific starting point for scanning within a superframe. The end point will be the scanning interval value in addition of this value. Since the AMS has to receive the SFH, and while the Primary-Preamble does not aid synchronization, the AMS shall receive either one of the remaining 2 secondary-Preambles. If 0, it means that the first S-preamble is to be scanned as the scanning initiating point. If 1, it means that the second S-preamble is to be scanned as the scanning initiating point. |
| N_Recommended_BS_Carrier | 8 | Number of carriers to be scanned for this neighbor BS. |
| If (N_Recommended_BS_Carrier !=0) { | | |
| Recommended_BS_Carrier_Bitmap_Index | 8 | Index of carrier to be scanned for this neighbor BS |
| For (j=0; j < N_Recommended_BS_Carrier; j++){ | | |
| Start_frame_offset | 8 | The time offset in units of frames for each carrier index that is toggled in the Recommended_BS_Carrier_Bitmap_Index to start scanning. Each Start_frame_offset refers to the toggled carrier index in orderly manner. |
| } } } } } else { | | |
| N_Recommended_BS_Index | 8 | Number of neighboring BS to be scanned or associated, which are using BS index that corresponds to the position of BS in AAI_NBR-ADV message. If N_Recommended_BS_Index, N_Recommended_BS_Full, Use_Nbr_Bitmap_Index, and Use_Req_Bitmap_Index are set to 0, the BS recommends the MS scan all neighbors listed in the AAI_NBR-ADV message. MS may scan a sub-set of the list. |
| If(N_Recommended_BS_Index !=0){ | | |
| Configuration change count for AAI_NBR-ADV | 8 | Configuration Change Count value of referring AAI_NBR-ADV message. |
| } If( Use_Req_Bitmap_Index == 1) | | |
| Req_Seq_Num | 1 | One-bit sequence number for the corresponding AAI_SCN-REQ message. |

TABLE 4-continued

| Syntax | Size (bit) | Notes |
|---|---|---|
| Reserved | 1 | |
| Req_Bitmap_Size | 6 | Size of Req_Bitmap_Index in nibbles ((Req_Bitmap_Size + 1)*4), which may be less than or equal to the number of BSs in AAI_SCN-REQ. |
| Req_Bitmap_Index | (Req_Bitmap_Size + 1)*4 | Each bit position in this bitmap corresponds to a BS Index of the corresponding AAI_SCNREQ message, where the least significant bit corresponds to the first BS Index, each next significant bit corresponds to the next BS Index, the most significant bit corresponds to the BS Index of the last rec-ommended BS, and BSs with BS Index greater than the last recommended BS are not recommended and do not have a correspond-ing bit position in the bitmap. Bitmap position bit value: 0: the corresponding BS is not recom-mended. 1: the corresponding BS is recommended. |
| for( each '1' in Req_Bitmap_Index ) { | | |
| N_Recommended_BS_Carrier | 8 | Number of carriers to be scanned for this neighbor BS. |
| If (N_Recommended_BS_Carrier !=0) { | | |
| Recommended_BS_Carrier_Bitmap_Index | 8 | Index of carrier to be scanned for this neighbor BS |
| For (j = 0; j < N_Recommended_BS_Carrier; j++){ | | |
| Start_frame_offset | 8 | The time offset in units of frames for each carrier index that is toggled in the Rec-ommended_BS_Carrier_Bitmap_Index to start scanning. Each Start_frame_offset refers to the toggled carrier index in orderly manner. |
| } } } } | | |
| N_Recommended_BS_Full | 8 | Number of neighboring BS to be, which are using full 48 bits BS ID. |
| For(j = 0; j < N_Recommended_BS_Full; j++){ | | |
| Recommended BS ID | 48 | BS IDs of BSs that MS shall scan. |
| } | | |
| Padding | variable | |
| } | | |
| TLV encoded information | variable | |
| } | | |

Referring to Table 4, neighbor frame offset (Nbr_Frame_offset) information set by a subframe unit is included in a scan response message. If a frame structure of a scan target base station is different from that of a serving base station, it is able to inform a mobile station of offset information to match a timing point of transmitting a preamble from the scan target base station.

If a neighbor frame offset is not set to 0 (i.e., if a frame structure is different from that of a serving base station), frame configuration information of a target base station can be further transmitted.

And, scanning interval information set by a unit of subframe can be included in the scan response message.

Moreover, neighbor scanning start frame (Nbr_Scanning_start_frame) information can be included in the scan response message. This information indicates a timing point for a mobile station to start a scan within a super frame. The end point of the scanning can correspond to a timing point at which a scanning interval elapses from a point indicated by the neighbor scanning start frame information. As a super frame header is transmitted in a first subframe in a super frame and a PA preamble is transmitted in a second subframe, a mobile station is able to receive an SA preamble via a third or fourth frame. When the neighbor scanning start frame information has a 1-bit size, if it is set to 0, it means that a first SA preamble (e.g., 3rd frame) is to be scanned as the scanning initiating point by a mobile station. If it is set to 1, it means that a second SA preamble (e.g., 4th frame) is to be scanned as the scanning initiating point by a mobile station. Alternatively, the scanning start frame information includes 2 bits to indicate one of four frames. Alternatively, the scanning start frame information is configured as 4-bit bitmap to indicate at least one frame in order.

Meanwhile, the information on the interleaving interval, which is the interval for a mobile station to perform a data exchange with a serving base station because a scan is not scheduled between the scanning intervals, can be included in the scan response message as well.

Second Embodiment

According to another embodiment of the present invention, when a mobile station performs a scan on a neighbor base station, a method of further reducing an interruption time by subdividing a scan duration is provided.

In particular, a scanning operation of a mobile station can be performed in a manner of being divided into an interleaving interval having a scan fail to be scheduled therein and a scan duration having a scan performed therein. In this case, the scan duration can be subdivided into a sub-scan duration, in which a mobile station performs a base station switching and a preamble reception, and a sub-interleaving interval in which a mobile station can perform a data exchange with a serving base station. That is, since a mobile station is able to perform a communication with a serving base station during a sub-interleaving interval despite a scan duration, the serving base station is able to perform a scheduling on the corresponding mobile station.

A mobile station receives an allocation of information necessary for a scanning via a scan response message to perform a scan. The information may include a scanning interval, a scan duration, a start frame indicating a start frame of initial scan duration, an interleaving interval indicating a duration or length of an interval for performing a normal communication with a serving base station, a scan iteration information indicating how many times a scan duration and an interleaving interval are iterated, and the like.

Since a time (i.e., a BS switching time) for a mobile station to switch to a status capable of receiving a frequency of a neighbor base station by changing a frequency of each mobile station to perform a scan of a subframe unit differs from that of another mobile station, the mobile station is able to send a scan request (AAI_SCN-REQ) message to a serving base station in case of making a scan request thereto in a manner that its BS switching capability is included in the scan request message. In response to the scan request message, the serving base station sends a scan response (AAI_SCN-RSP) message including scanning interval information to the mobile station in a manner that the scanning interval information is set in consideration of the BS switching capability of the mobile station.

In doing so, as mentioned in the foregoing description, if a transition time greater than a specific interval (e.g., subframe, symbol, idle time, RTG, etc.) is requested by the mobile station like the case of performing a camping by utilizing an idle time/transmission-reception transition gap (TTG) in the UL interval, granularity predefined in the scanning interval can be further allocated. For this, it is able to set a scanning interval in a manner that a presence or non-presence of additional allocation of a scanning interval is indicated via a mobile station feedback of 1-bit indication level.

In this case, the scanning interval in the scan duration, an interval corresponding to a BS switching time before the scanning interval and an interval corresponding to the BS switching time after the scanning interval can become a sub-scan duration or an interval resulting from excluding the sub-scan duration from the scan duration can become a sub-interleaving interval. This is explained with reference to FIG. 4 as follows.

Figure 4:
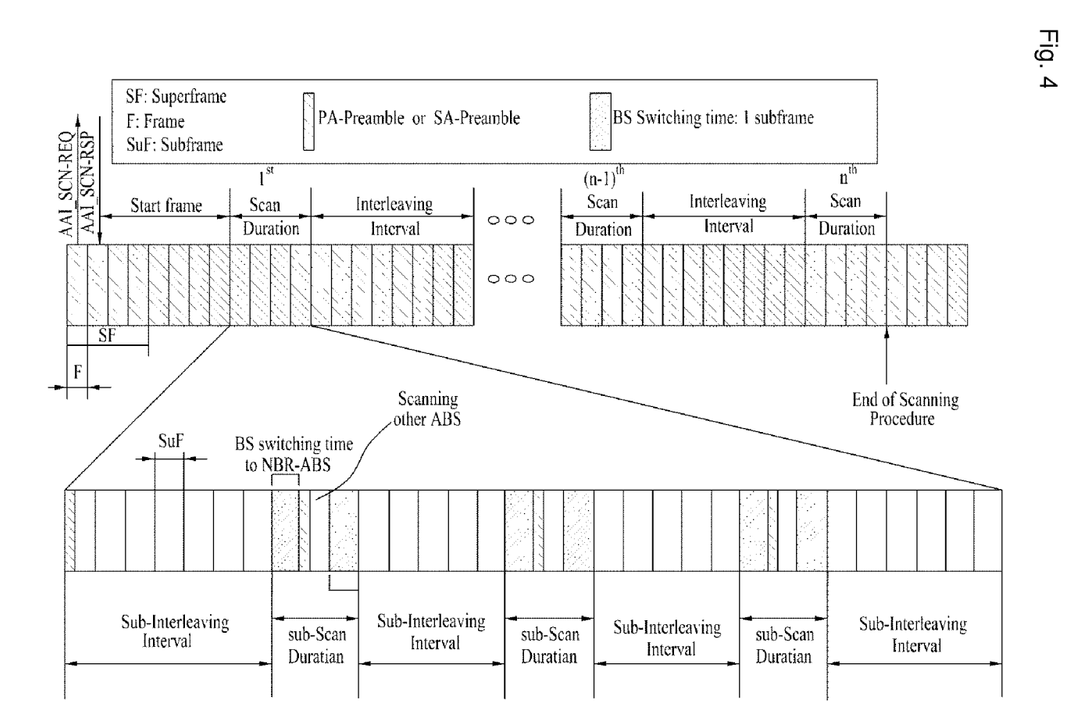
FIG. 4 is a diagram of one example for a scan duration and interleaving interval setting according to another embodiment of the present invention.

FIG. 4 is a diagram of one example for a scan duration and interleaving interval setting according to another embodiment of the present invention. In FIG. 4, assume that a base station (BS) switching time is negotiated into 1 subframe between a mobile station and a serving base station.

Referring to FIG. 4, in a scanning interval negotiation, both a mobile station and a serving base station mutually recognize that 1 subframe before a specific subframe (i.e., a subframe in which a preamble is transmitted) of a scan target base station and 1 subframe after the specific subframe are not available. Therefore, the serving base station is aware that the mobile station is not available during total 3 subframe intervals (i.e., sub-scan duration) including a subframe, in which a preamble of the scan target base station is transmitted, in a scanning interval and does not perform scheduling (control signaling included) for data allocation to the mobile station. In this case, if a camping is performed within a subframe for transmitting a preamble, transition (BS switching) is possible within the corresponding subframe. Hence, the scan duration can be set to a level of 1 or 2 subframes. Moreover, the sub-scan duration and the sub-interleaving interval can be iterated within the scan duration. Therefore, the mobile station is able to receive all of the SA preamble, PA preamble and super frame header of the san target base station during one san duration according to the settings of a start frame value and the scan duration.

Meanwhile, according to another example of the present embodiment, start and end points of a scan can be allocated in consideration of a BS switching time. This is explained with reference to FIG. 5 as follows.

Figure 5:
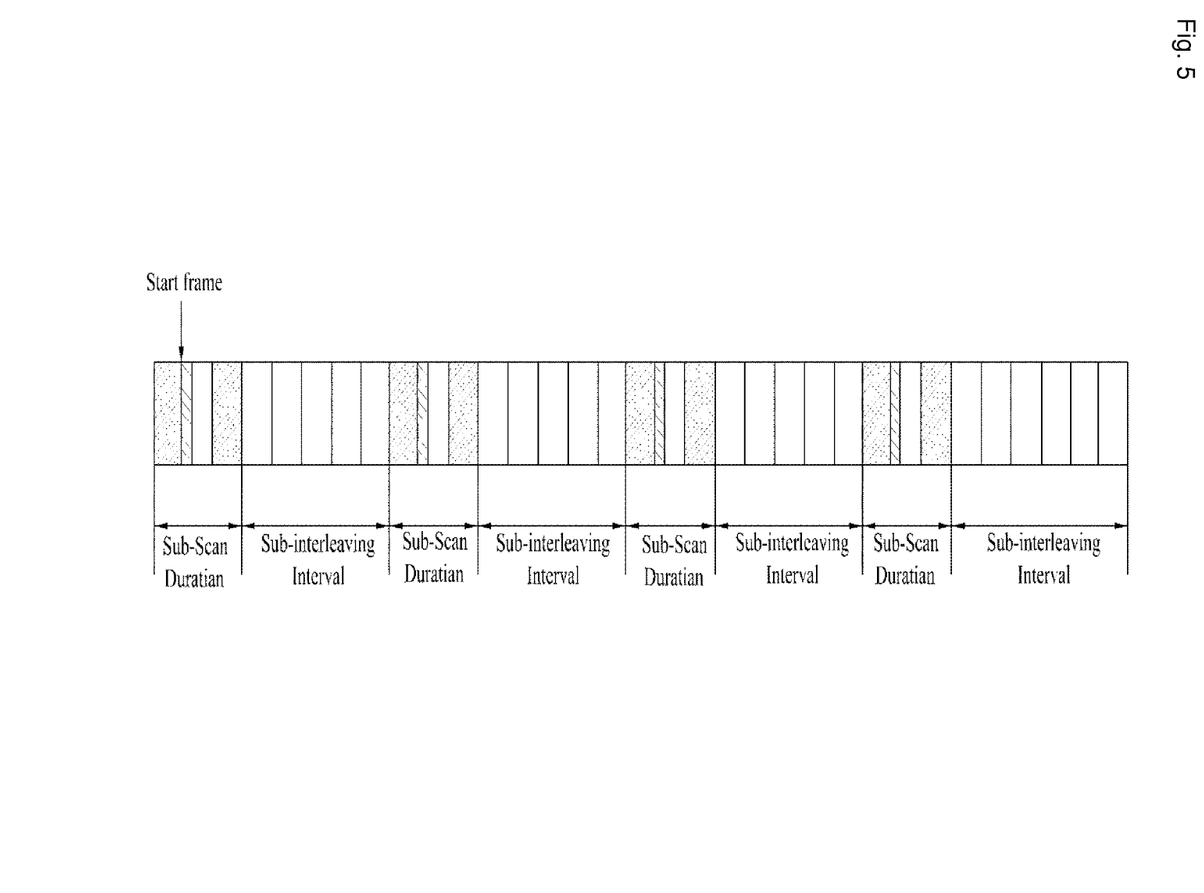
FIG. 5 is a diagram of a relation between start frame information and base station switching time according to another embodiment of the present invention.

FIG. 5 is a diagram of a relation between start frame information and base station switching time according to another embodiment of the present invention.

Referring to FIG. 5, a scan duration starts with a timing point ahead of a BS switching time in a frame indicated by start frame information of a frame unit. So to speak, 'point indicated by a start frame minus BS switching time' becomes a start point of an initial san duration, i.e., a scan start timing point.

According to another example for the present embodiment, a start frame can be allocated by a subframe unit. In this case, a start frame value preferably indicates a start point of a scan duration in consideration of a BS switching time.

Third Embodiment

According to a further embodiment of the present invention, a scanning method in further consideration of a legacy system is proposed.

Legacy system in this disclosure includes a system to which general technologies including IEEE 802.16e (wirelessMAN-OFDMA reference system) specification. A frame structure of a base station of IEEE 802.16m specification supporting this legacy system specification (wirelessMAN-OFDMA reference system/WirelessMAN OFDMA advanced coexisting system, legacy supportive) is operated in a manner of dividing parts of DL/UL interval into LZone (IEEE 802.16e specification supportive) and MZone (IEEE 802.16m specification supportive) (e.g., TDD). In this disclosure, for clarity and convenience, a base station (ABS) mode supporting a legacy mobile station is named 'mixed mode' and a base station (ABS) mode not supporting a legacy mobile station is named '16m only mode'.

According the present invention, scanning operations of a mobile station, which meets the IEEE 802.16m specification, can be classified into the followings.

(1) Case of Scanning to a 16m-only Neighbor Base Station (NBR-ABS) from a Serving Base Station Operating in Mixed Mode Since an NBR-ABS operates in 16m-only mode, a preamble is transmitted at a start position of a DL subframe, which may differ from a subframe for transmitting a preamble of a serving base station MZone. Preferably, information on this is carried on AAI_SCN-RSP message. Since a mobile station inevitably performs a BS switching (transition) in the Mzone of a serving base station to perform a scan to a subframe of a DL start position of a scan target base station in case of setting a san duration, a BS switching time should be further taken into consideration.

(2) Case of Scanning to a Neighbor Base Station Operating in Mixed Mode from a Serving Base Station Operating in 16m-only Mode Since an NBR-ABS operated in a mixed mode, a position of a subframe for transmitting a preamble varies according to a frame offset of the NBR-ABS or LZone/Mzone setting. Therefore, the corresponding information is preferably carried on AAI_SCN-RSP. Moreover, a scan duration is preferably determined in consideration of a BS switching time before or after MZone start DL subframe of a scan target base station. For this, in case that offset information of MZone of NBR-ABS is carried on AAI_SCN-RSP message, it is able to set a scan duration before or after a subframe for transmitting a preamble in a manner of combining corresponding information, start frame information, a base station switching time and the like together. In case that a scan target base station is a neighbor base station not included in a neighbor advertisement (AAI_NBR-ADV) message, a mobile station is unaware of the aforesaid frame offset or LZone/MZone setting information, the mobile station is informed on the corresponding information via the AAI_SCN-RSP message.

(3) Case of Scanning to a Neighbor Base Station (NBR-ABS) Operating in Mixed Mode from a Serving Base Station Operating in Mixed Mode If the setting of LZone/MZone of a serving base station is equal to that of a scan target base station, a mobile station is able to perform a scan on the san target base station without separate information using information on a frame structure of the serving base station. Yet, each base station can have a zone setting different per carrier for load balancing of LZone and the like in general.

Considering this, a mobile station needs to obtain information on a subframe, in which a preamble is transmitted, from MZone of an NBR-ABS. In doing so, regarding a san duration setting, since LZone interval exists in a serving base station as well as the NBR-ABS in case of downlink, an interval setting of a start subframe of the MZone is not necessary. Therefore, regarding the scan duration setting information, it is possible to turn off an operation of giving offset to all subframes of a corresponding frame.

Thus, for the scanning operation coexisting with the mixed mode, a function of a start subframe (or a subframe offset) is turned off or interpreted differently to enable an efficient scanning operation in case of setting mode information of a corresponding carrier, frame offset, zone configuration information or scan duration for the NBR_ABS.

Meanwhile, in the above described embodiments, a time for receiving a preamble of a scan target base station substantially is represented as a scanning interval and a time including a scanning interval and BS switching times before and after the scanning interval is defined as a sub-scan duration. Start frame information indicates a frame in which a scanning interval starts in the description of the first embodiment, while indicating a frame in which an initial scan duration starts in the description of the second embodiment. Thus, a name and/or meaning of a parameter indicating a corresponding interval, a corresponding time or the like can be changed if necessary.

Structures of Mobile Station and Base Station

In the following description, a mobile station and base stations (FBS, MBS) according to another further embodiment of the present invention for implementing the above described embodiments of the present invention are explained.

First of all, a mobile station works as a transmitter in uplink and is able to work as a receiver in downlink. A base station works as a receiver in uplink and is able to work as a transmitter in downlink. That is, each of the mobile station and the base station can include a transmitter and a receiver for transmission of information and/or data.

Each of the transmitter and the receiver can include a processor, a module, a part and/pr a means for performing embodiments of the present invention. In particular, each of the transmitter and the receiver can include a module (means) for encrypting a message, a module for interpreting the encrypted message, an antenna for transceiving the message and the like. Examples of these transmitting and receiving sides are explained with reference to FIG. 6 as follows.

Figure 6:
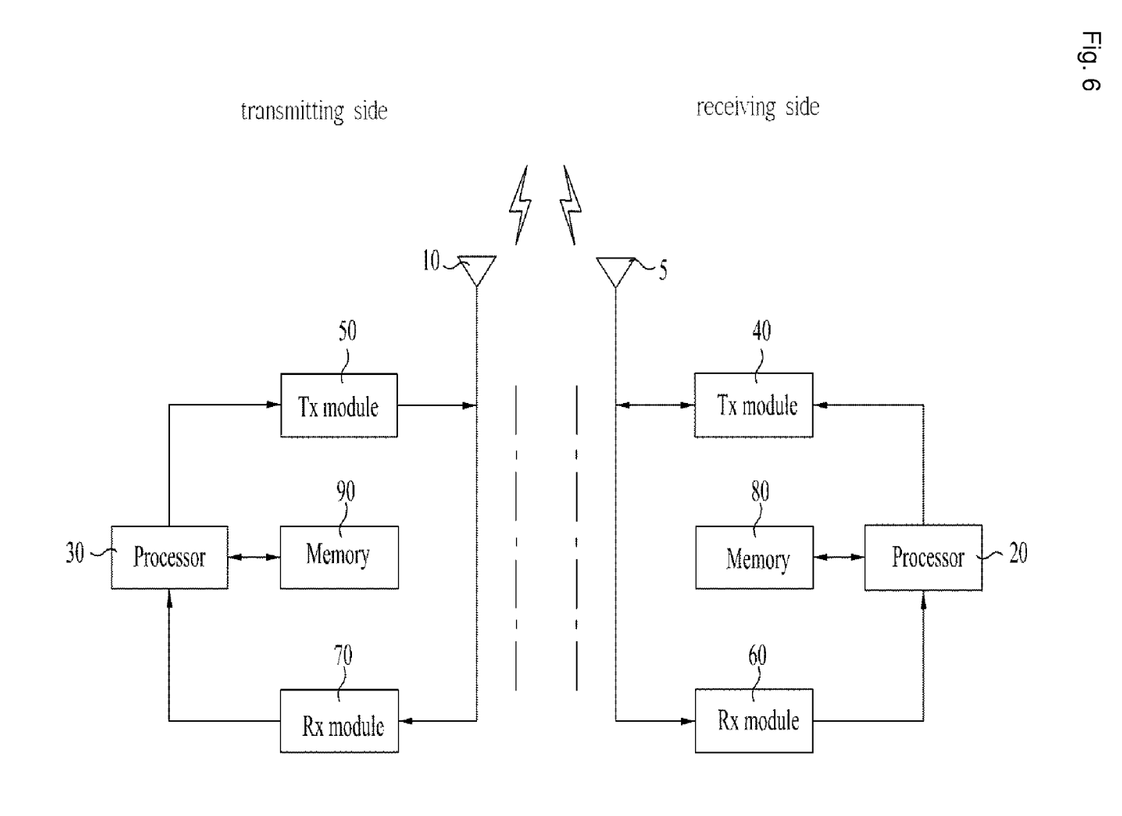
FIG. 6 is a block diagram of one example for a transmitting and receiving side structure according to another embodiment of the present invention.

FIG. 6 is a block diagram for an example of a transmitting and receiving side structure according to another embodiment of the present invention.

Referring to FIG. 6, a left side shows a structure of a transmitting side and a right side shows a structure of a receiving side. The transmitting/receiving side can include an antenna 5/10, a processor 20/30, a transmitting (Tx) module 40/50, a receiving (Rx) module 60/70 and a memory 80/90. Each of the elements can perform a corresponding function. The respective elements are explained in detail as follows.

First of all, the antenna 5/10 performs a function of transmitting a signal generated by the Tx module 40/50 externally or a function of receiving a radio signal externally and then delivering the received radio signal to the Rx module 60/70. If MIMO function is supported, at least two antennas can be provided.

The antenna, Tx module and Rx module can configure a radio communication (RF) module.

The processor 20/30 controls overall operations of the transmitting or receiving side in general. For instance, the processor 20/30 can perform a controller function for performing the above described embodiments of the present invention, a MAC (medium access control) frame variable control function, a handover function, an authentication function, an encryption function and the like. In particular, the processor 20/30 can perform overall controls to perform the handover procedures shown in FIGS. 3 to 5.

In particular, a processor of a mobile station can control a scan request (AAI_SCN-REQ) message to be sent to a serving base station to perform a scan operation. In doing so, information on BS switching capability of the mobile station can be included in the scan request message.

The processor of the mobile station can acquire information on a scanning interval, a start frame and the like of a scan target base station via a scan response (AAI_SCN-RSP) message received in response to the scan request message. Accordingly, the processor is able to control an execution of a switching to the scan target base station at a timing point ahead of a base station shift time from a timing point indicated by the start frame information. Afterwards, the processor receives a preamble from the scan target base station during the scanning interval.

Meanwhile, in case that a san duration and an interleaving interval are included in the scan request message, the processor of the mobile station operates in a sub-scan duration during a time corresponding to a scanning interval and base station switching times before and after the scanning interval and then operates in a sub-interleaving interval until a next sub-scan duration. In this case, the sub-scan duration can be iterated by a frame unit. The processor can control a data exchange with a base station to be normally performed. In this case, the start frame information can indicate a time until a first scan duration arrives from a time of receiving a scan response message.

Besides, the processor of the mobile station can perform overall control operations of the operating processes disclosed in the descriptions of the above mentioned embodiments.

The Tx module 40/50 performs prescribed coding and modulation on data, which is scheduled to be externally transmitted by the processor 20/30, and is then able to deliver the coded and modulated data to the antenna 10/5.

The Rx module 60/70 reconstructs a radio signal externally received via the antenna 5/10 into original data by performing decoding and demodulation on the radio signal and is then able to deliver the reconstructed original data to the processor 20/30.

A program for processing and control of the processor 20/30 can be stored in the memory 80/90. And, the memory 20/30 can perform a function for temporary storage of inputted/outputted data. Moreover, the memory 80/90 can include at least one storage medium of such a type as a flash memory type, a hard disk type, a multimedia card micro type, a card type of memory (e.g., SD memory, XD memory, etc.), a Random Access Memory (RAM) type, an SRAM (Static Random Access Memory type), a Read-Only Memory (ROM) type, an EEPROM (Electrically Erasable Programmable Read-Only Memory) type, a PROM (Programmable Read-Only Memory) type, a magnetic memory type, a magnetic disc type, and optical disc type, and the like.

Meanwhile, a base station uses at least one of the above mentioned modules to perform a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and electric wave environment, a fast traffic real-time control function, a handover function, an authentication and encryption function, a packet modulation/demodulation function for data transmission, a fast packet channel coding function, a real-time modem control function and the like or can further include separate means, modules and/or parts for performing these functions.

Industrial Applicability

Accordingly, the present invention is applicable to various wireless access systems.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. Moreover, claims failing to be explicitly cited in-between are combined to construct new embodiments or can be included as new claims by Amendment after filing the application.

The invention claimed is:

1. A method of scanning a neighbor base station by a mobile station in a broadband wireless access system, the method comprising:
receiving a scan response (AAI_SCN-RSP) message including information of a first duration, a first interval for the mobile station to receive a preamble of the neighbor base station from a serving base station and a second interval for the mobile station to perform a data exchange with the serving base station, wherein the first duration includes at least one second duration, wherein each of the at least one second duration includes the first interval and base station (BS) switching times located before and after the first interval, wherein each of the at least one second duration is allocated on three consecutive downlink subframes, and wherein each of the BS switching times corresponds to a length of a subframe; and
receiving the preamble from the neighbor base station in the first interval,
wherein the first interval is a scanning interval, and
wherein the first interval is set in units of the subframe.

2. The method of claim 1, wherein the scan response message further includes a start frame information and wherein the reception of the preamble is performed in a frame indicated by the start frame information.

3. The method of claim 1, further comprising performing the data exchange with the serving base station during a third interval resulting from excluding the at least one second duration from the first duration.

4. The method of claim 1, wherein the scan response message further includes information indicating a count of iterating the first duration and the second interval.

5. The method of claim 1, further comprising sending a scan request message including BS switching capability information of the mobile station for determining the base station switching time to the serving base station.

6. The method of claim 3, wherein the second interval is an interleaving interval, wherein the third interval is a sub-interleaving interval, wherein the first duration is a scan duration, and wherein the second duration is a sub-scan duration.

7. A method for supporting a mobile station to scan a neighbor base station of a serving base station in a broadband wireless access system, the method comprising:
transmitting a scan response (AAI_SCN-RSP) message including information of a first duration and a first interval for the mobile station to receive a preamble of the neighbor base station to the mobile station,
wherein the first interval is a scanning interval,
wherein the first interval is set in units of a subframe,
wherein the first duration includes the at least one second duration, and each of the at least one second duration includes the first interval and base station (BS) switching times located before and after the first interval,
wherein the serving base station does not perform a scheduling for the mobile station during the first interval and the base station (BS) switching times,
wherein each of the at least one second duration is allocated on three consecutive downlink subframes, and
wherein each of the BS switching times corresponds to a length of the subframe.

8. The method of claim 7, wherein the scan response message further includes information of a second interval for the mobile station to perform a data exchange with the serving base station.

9. The method of claim 8, wherein the base station performs the scheduling on the mobile station during a third interval resulting from excluding the at least one second duration from the first duration.

10. The method of claim 8, wherein the scan response message further includes information indicating a count of iterating the first duration and the second interval.

11. The method of claim 8, further comprising receiving a scan request message including BS switching capability information of the mobile station for determining the base station switching time from the mobile station.

12. The method of claim 9, wherein the second interval is an interleaving interval, wherein the third interval is a sub-interleaving interval, wherein the first duration is a scan duration, and wherein the second duration is a sub-scan duration.

13. A mobile station, comprising:
- a processor; and
- a radio communication (RF) module configured to transceive a radio signal externally under the control of the processor, wherein the processor is configured to:
- receive, from a serving base station, a scan response (AAI_SCN-RSP) message including information of a first duration, a first interval for the mobile station to receive a preamble of the neighbor base station from a serving base station and a second interval for the mobile station to perform a data exchange with the serving base station, wherein the first duration includes the at least one second duration, wherein each of the at least one second duration includes the first interval and base station (BS) switching times located before and after the first interval, wherein each of the at least one second duration is allocated on three consecutive downlink subframes, and wherein each of the BS switching times corresponds to a length of a subframe; and
- receive the preamble from the neighbor base station in the first interval, wherein the first interval is a scanning interval, and
wherein the first interval is set in units of the subframe.

14. The mobile station of claim 13, wherein the scan response message further includes a start frame information and wherein the processor controls the preamble to be received in a frame indicated by the start frame information.

15. The mobile terminal of claim 13, wherein the processor controls a data exchange with the serving base station to be performed during a third interval resulting from excluding the at least one second duration from the first duration.

16. The mobile terminal of claim 15, wherein the second interval is an interleaving interval, wherein the third interval is a sub-interleaving interval, wherein the first duration is a scan duration, and wherein the second duration is a sub-scan duration.

* * * * *